(12) United States Patent
Wu (10) Patent No.: US 9,624,951 B2
(45) Date of Patent: Apr. 18, 2017

(54) CONNECTION TERMINAL STRUCTURE (71) Applicant: DINKLE ENTERPRISE CO., LTD., New Taipei (TW)

(72) Inventor: Shang Tsai Wu, New Taipei (TW)

(73) Assignee: DINKLE ENTERPRISE CO., LTD., New Taipei (TW)

(*) Notice: Subject to any disclaimer, the term of this patent is extended or adjusted under 35 U.S.C. 154(b) by 0 days.

(21) Appl. No.: 14/701,028

(22) Filed: Apr. 30, 2015

(65) Prior Publication Data
US 2016/0319853 A1 Nov. 3, 2016

(51) Int. Cl.
```
H01R 4/26       (2006.01)
H01R 4/48       (2006.01)
H01R 11/20      (2006.01)
F16B 2/22       (2006.01)
H01R 11/00      (2006.01)
```

(52) U.S. Cl.
CPC ............ *F16B 2/22* (2013.01); *H01R 4/26* (2013.01); *H01R 4/48* (2013.01); *H01R 11/00* (2013.01); *H01R 11/20* (2013.01)

(58) Field of Classification Search
CPC ................................ F16B 2/22; H01R 4/4827
USPC .............. 439/378, 828, 858, 444, 835, 441
See application file for complete search history.

(56) References Cited

U.S. PATENT DOCUMENTS

| | | | | |
|---|---|---|---|---|
| 6,074,242 A * | 6/2000 | Stefaniu | ............... | H01R 4/4827 439/441 |
| 6,796,855 B2 * | 9/2004 | Fricke | ................. | H01R 4/4818 439/835 |
| 6,893,286 B2 * | 5/2005 | Drewes | ................. | H01R 31/08 439/441 |
| 6,911,602 B2 * | 6/2005 | Conrad | ............... | H01R 9/2691 174/68.2 |
| 7,083,463 B2 * | 8/2006 | Steinkemper | ........ | H01R 4/4827 439/441 |
| 7,238,043 B2 * | 7/2007 | Reibke | ................. | H01R 4/4827 439/441 |
| 7,896,686 B2 * | 3/2011 | Hoppe | ................. | H01R 4/4827 439/441 |
| 8,251,738 B2 * | 8/2012 | Heckert | ............... | H01R 4/4836 439/441 |
| 8,408,952 B2 * | 4/2013 | Wu | ...................... | H01R 4/4818 439/441 |

(Continued)

*Primary Examiner* — Amy Cohen Johnson
*Assistant Examiner* — Milagros Jeancharles
(74) *Attorney, Agent, or Firm* — Chun-Ming Shih; HDLS IPR Services (57) ABSTRACT

A connection terminal structure includes a basic element and a clamping element. The basic element is bent to be L-shaped and includes a longitudinal arm and a transverse arm connected to the longitudinal arm. An upper end of the longitudinal arm forms an engaging flange and an engaging shoulder portion. A right end of the transverse arm forms a joint portion. The clamping element comprises a resilient clamping arm, a supporting arm, and a connecting arm. The connecting arm forms an opening portion and extends from the supporting arm to the longitudinal arm. The opening portion fits around the engaging shoulder portion. A lower end of the supporting arm forms a joint end jointed to the joint portion. The resilient clamping arm connects with the supporting arm, extends to the longitudinal arm, has a front end engaging with the engaging flange, and penetrates the opening portion to move resiliently.

3 Claims, 7 Drawing Sheets (56) References Cited

U.S. PATENT DOCUMENTS

| | | | |
|---|---|---|---|
| 8,512,068 B2* | 8/2013 | Gassauer | H01R 9/2491 |
| | | | 439/411 |
| 8,632,355 B2* | 1/2014 | Hartmann | H01R 4/4845 |
| | | | 439/411 |
| 9,136,614 B2* | 9/2015 | Sasano | H01R 4/4827 |
| 9,502,795 B1* | 11/2016 | Wu | H01R 4/4827 |

* cited by examiner

CONNECTION TERMINAL STRUCTURE

BACKGROUND OF THE INVENTION

1. Technical Field

The present invention relates to connection terminal structures, and more particularly, to a connection terminal structure characterized advantageously by structural simplicity, ease of shaping, low costs, and a simple assembly process.

2. Description of Related Art

A conventional connection terminal structure for use with a typical electronic device is adapted to build an electrical connection whereby different electronic components disposed in the electronic device are electrically connected.

For instance, a conventional connection terminal structure comprises an insulating case and a connection clamp disposed therein. The connection clamp has a resilient clamping arm. To build an electrical connection, an electrical wire is passed through a through-hole of the insulating case to reach the connection clamp and drive the resilient clamping arm to move. Then, the electrical wire is clamped by the connection clamp under a resilient force generated from the resilient clamping arm, thereby effectuating the electrical connection.

However, the conventional connection terminal structure is characterized disadvantageously by structural complexity, difficulty in shaping, high costs, and an intricate assembly process.

In view of this, the inventor of the present invention puts forth a technical solution, i.e., a connection terminal structure, for solving the aforesaid problems and achieving advantages, including structural simplicity, ease of shaping, low costs, and a simple assembly process.

BRIEF SUMMARY OF THE INVENTION

A connection terminal structure of the present invention comprises a basic element and a clamping element. The basic element is bent to be L-shaped and comprises a longitudinal arm and a transverse arm connected to the longitudinal arm. An upper end of the longitudinal arm forms an engaging flange and an engaging shoulder portion. A right end of the transverse arm forms a joint portion. The clamping element comprises a resilient clamping arm, a supporting arm, and a connecting arm. The connecting arm forms an opening portion and extends from the supporting arm to the longitudinal arm. The opening portion of the connecting arm fits around and engages with the engaging shoulder portion. A lower end of the supporting arm forms a joint end. The joint end is jointed to the joint portion. The resilient clamping arm connects with the supporting arm and extends to the longitudinal arm. A front end of the resilient clamping arm engages with the engaging flange. The resilient clamping arm penetrates the opening portion to move resiliently.

Given the aforesaid structural design, the connection terminal structure is characterized advantageously by structural simplicity, ease of shaping, low costs, and a simple assembly process.

One of the joint portion and the joint end is a joint protruding end. The other one of the joint portion and the joint end is a joint hole. The joint protruding end is inserted into the joint hole.

The longitudinal arm comprises a surface. The surface faces the clamping element. The surface forms thereon a wavy stripe.

The transverse arm bends downward to form a leg.

DETAILED DESCRIPTION OF THE INVENTION

Figure 1:
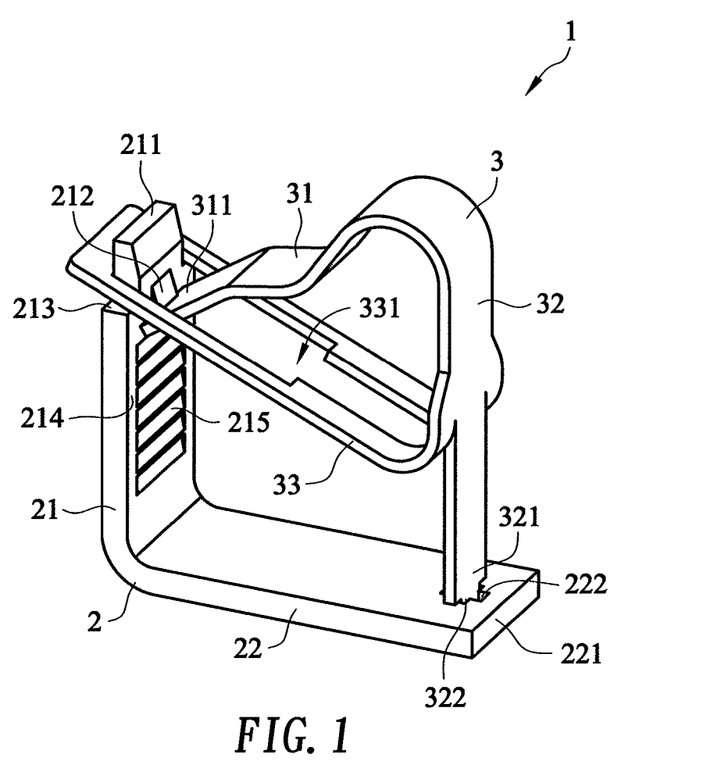
FIG. 1 is a perspective view according to the first preferred embodiment of the present invention.

FIG. 1 is a perspective view according to the first preferred embodiment of the present invention.

Referring to FIG. 1, a connection terminal structure 1 comprises a basic element 2 and a clamping element 3. The basic element 2 is bent to be L-shaped and comprises a longitudinal arm 21 and a transverse arm 22 connected to the longitudinal arm 21. An upper end 211 of the longitudinal arm 21 forms an engaging flange 212 and an engaging shoulder portion 213. A right end 221 of the transverse arm 22 forms a joint portion 222. The clamping element 3 comprises a resilient clamping arm 31, a supporting arm 32, and a connecting arm 33. The connecting arm 33 forms an opening portion 331. The connecting arm 33 extends from the supporting arm 32 to the longitudinal arm 21. The opening portion 331 of the connecting arm 33 fits around and engages with the engaging shoulder portion 213 of the longitudinal arm 21. A lower end 321 of the supporting arm 32 forms a joint end 322. The joint end 322 is jointed to the joint portion 222 of the transverse arm 22. The resilient clamping arm 31 connects with the supporting arm 32 and extends to the longitudinal arm 21. A front end 311 of the resilient clamping arm 31 engages with the engaging flange 212 of the longitudinal arm 21. The resilient clamping arm 31 penetrates the opening portion 331 to move resiliently.

Figure 2:
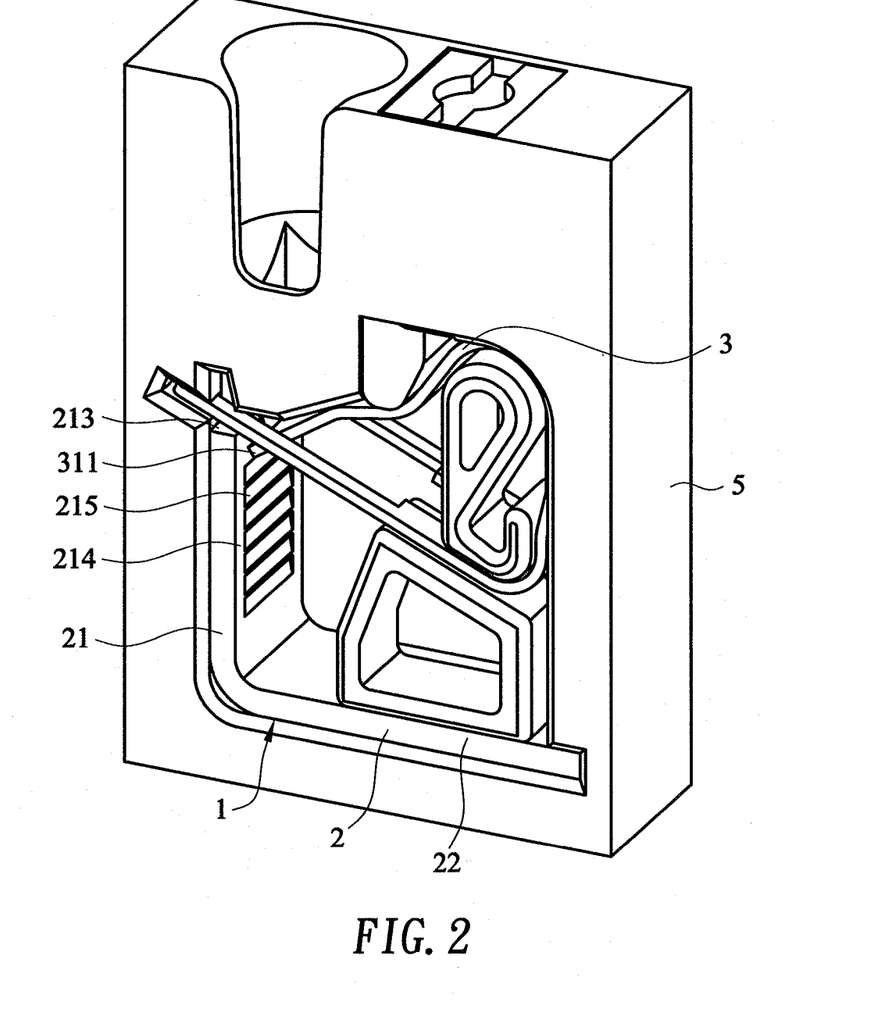
FIG. 2 is a schematic view of operation according to the first preferred embodiment of the present invention.

FIG. 2 is a schematic view of operation according to the first preferred embodiment of the present invention. Referring to FIG. 2, the connection terminal structure 1 is disposed in an insulating case 5 in order to operate.

Figure 3:
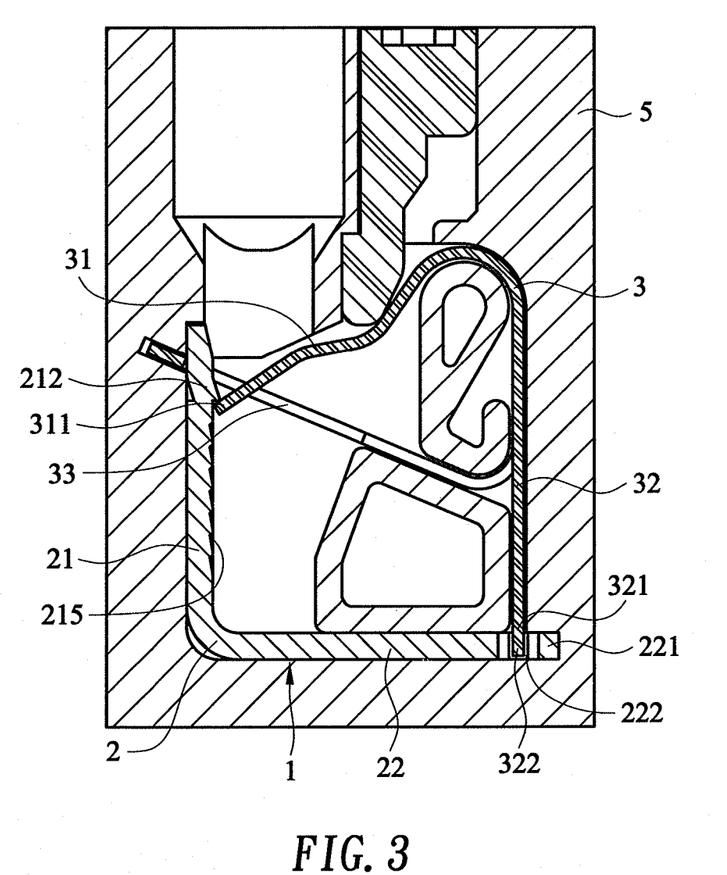
FIG. 3 is a schematic view of an unactuated state according to the first preferred embodiment of the present invention.
Figure 4:
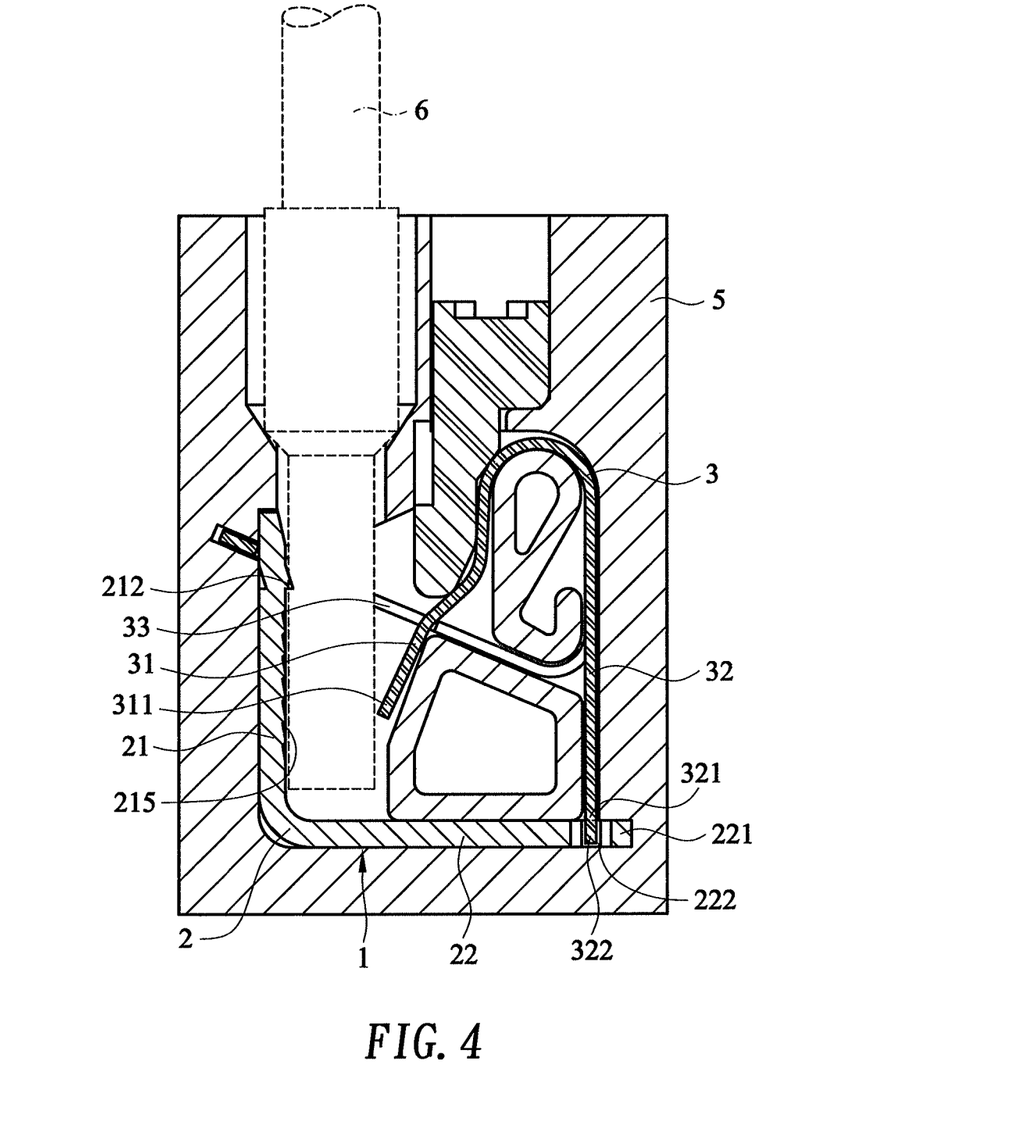
FIG. 4 is a schematic view of an actuated state according to the first preferred embodiment of the present invention.

FIG. 3 is a schematic view of an unactuated state according to the first preferred embodiment of the present invention. FIG. 4 is a schematic view of an actuated state according to the first preferred embodiment of the present invention.

Referring to FIG. 3, in an unactuated state, that is, at the point in time when an electrical wire 6 (shown in FIG. 4) has not yet been inserted with a view to building an electrical connection, under a resilient force generated from the resilient clamping arm 31 of the clamping element 3, the front end 311 of the resilient clamping arm 31 engages with the engaging flange 212 of the longitudinal arm 21. Referring to FIG. 4, upon insertion of the electrical wire 6 with a view to building an electrical connection, the electrical wire 6 thus inserted abuts against the resilient clamping arm 31 and keeps driving the resilient clamping arm 31 downward to move resiliently. Referring to FIG. 1 and FIG. 4, at this point in time, the resilient clamping arm 31 penetrates the opening portion 331 of the connecting arm 33 to move resiliently. After the electrical wire 6 has been fully inserted, the electrical wire 6 is clamped under the resilient force generated from the resilient clamping arm 31, thereby effectuating the electrical connection.

As mentioned before, the connection terminal structure 1 is structurally simple as it only has a basic element 2 and a clamping element 3. It is easy to shape the basic element 2 and the clamping element 3 and thus not only reduce their manufacturing costs, material costs, and manual assembly costs greatly but also simplify an assembly process. Given the aforesaid structural design, the connection terminal structure is characterized advantageously by structural simplicity, ease of shaping, low costs, and a simple assembly process.

Referring to FIG. 1, from a structural point of view, one of the joint portion 222 of the transverse arm 22 and the joint end 322 of the supporting arm 32 is a joint protruding end, whereas the other one of the joint portion 222 of the transverse arm 22 and the joint end 322 of the supporting arm 32 is a joint hole, wherein the joint protruding end is inserted into the joint hole. In this embodiment, the joint end 322 of the supporting arm 32 is provided in the form of a joint protruding end, whereas the joint portion 222 of the transverse arm 22 is provided in the form of a joint hole, and vice versa.

Referring to FIG. 1, in this embodiment, the longitudinal arm 21 comprises a surface 214. The surface 214 faces the clamping element 3. The surface 214 forms thereon a wavy stripe 215. Given the aforesaid structural design, when the electrical wire 6 (shown in FIG. 4) is inserted into the clamping element 3, the wavy stripe 215 of the surface 214 of the longitudinal arm 21 augments the friction thereof such that the electrical wire 6 (shown in FIG. 4) is unlikely to escape.

Figure 5:
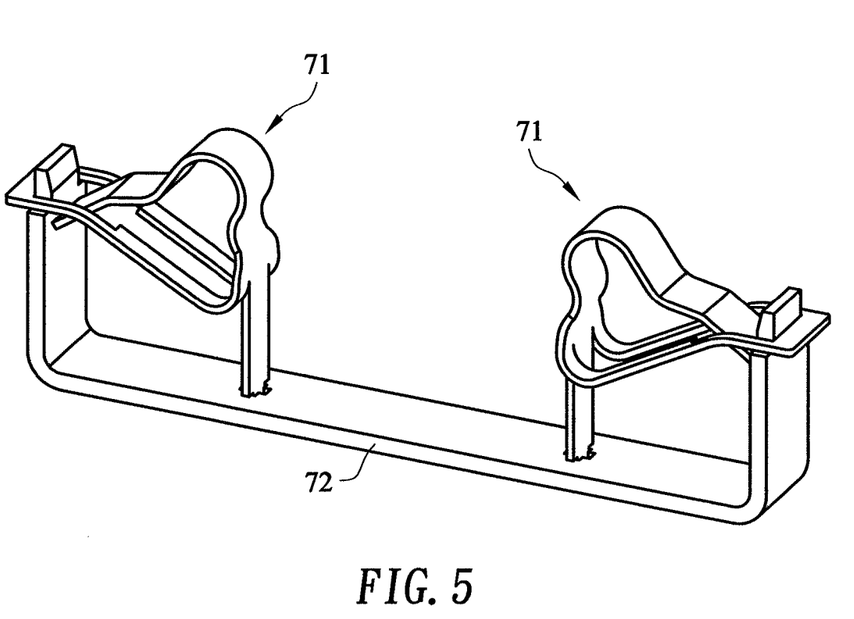
FIG. 5 is a perspective view according to the second preferred embodiment of the present invention.

FIG. 5 is a perspective view according to the second preferred embodiment of the present invention. The second preferred embodiment is identical to the first preferred embodiment in essential structural features, except that the second preferred embodiment is characterized by two connection terminal structures 71 each provided with a transverse arm 72 integrally formed. The aforesaid structural design of the second preferred embodiment achieves the advantages of the first preferred embodiment as well.

Figure 6:
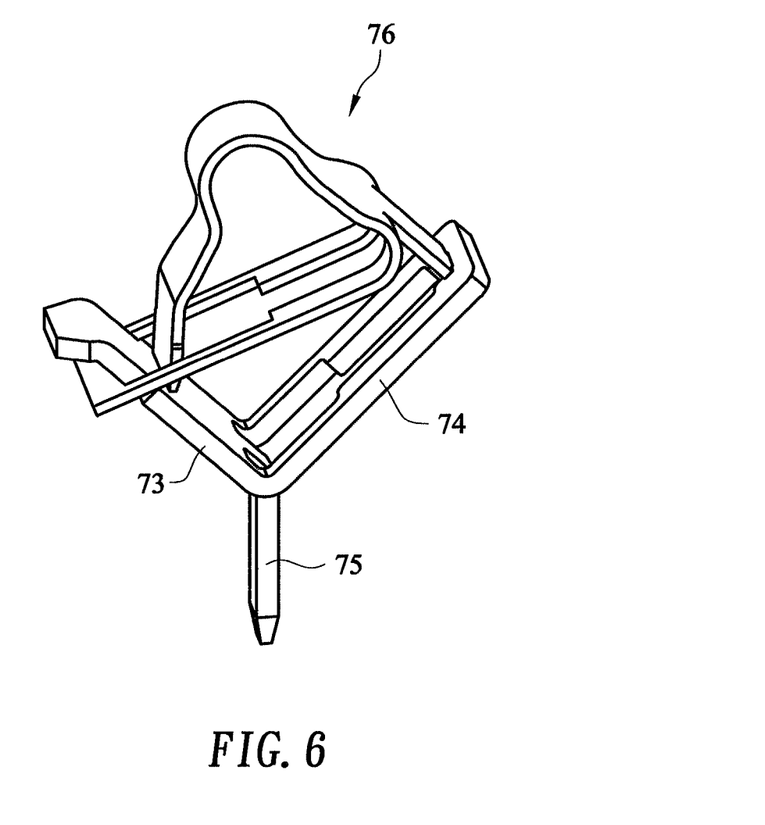
FIG. 6 is a perspective view according to the third preferred embodiment of the present invention.
Figure 7:
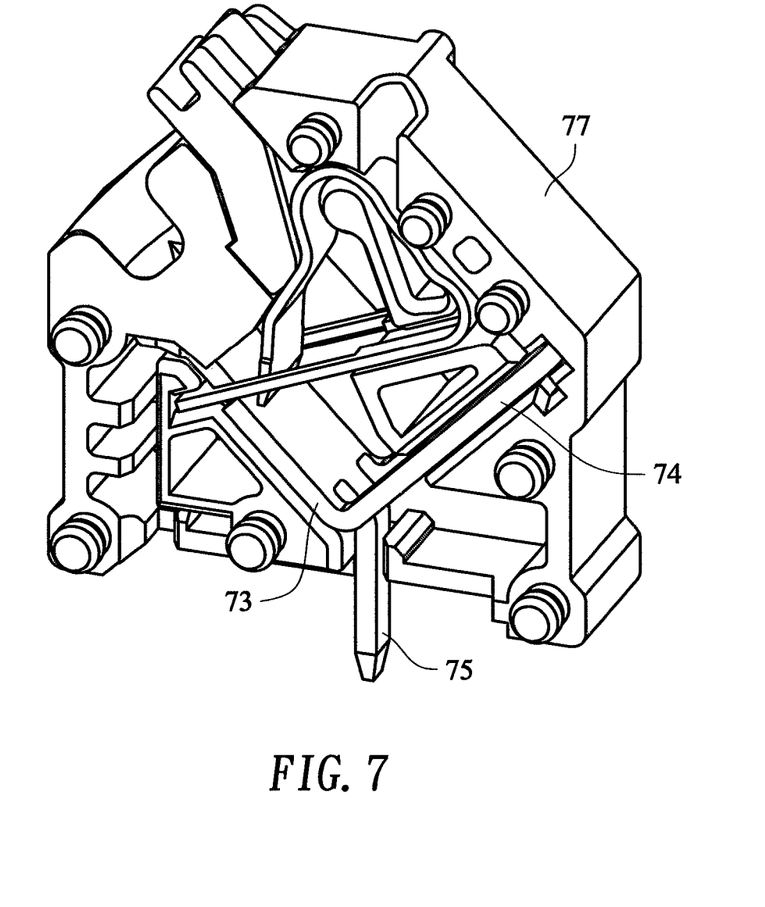
FIG. 7 is a schematic view of operation according to the third preferred embodiment of the present invention.

FIG. 6 is a perspective view according to the third preferred embodiment of the present invention. FIG. 7 is a schematic view of operation according to the third preferred embodiment of the present invention. The third preferred embodiment is identical to the first preferred embodiment in essential structural features, except that the third preferred embodiment is characterized in that: a transverse arm 74 of a basic element 73 is bent downward to form a leg 75; the leg 75 is adapted to come into contact with another electronic component; and a connection terminal structure 76 is disposed entirely in an insulating case 77. Likewise, the aforesaid structural design of the third preferred embodiment achieves the advantages of the first preferred embodiment as well.

The present invention is illustrated with preferred embodiments which are not restrictive of the present invention. All amendments, equivalent replacements, and improvements made to the preferred embodiments without departing from the spirit and principles of the present invention must be interpreted to fall within the scope of legal protection given to the present invention.

What is claimed is:

1. A connection terminal structure, comprising:
   a basic element bent to be L-shaped and comprising a longitudinal arm and a transverse arm directly connected to the longitudinal arm, the longitudinal arm having an upper end being formed with an engaging flange and an engaging shoulder portion, the engaging flange extending along a longitudinal direction of the L-shaped basic element; the transverse arm being a single flat plate and having a joint hole penetrating therethrough at a right end opposite to where the longitudinal arm directly connects to the transverse arm; and
   a clamping element comprising a resilient clamping arm, a supporting arm, and a connecting arm, wherein the connecting arm has an opening portion and extends from the supporting arm to the longitudinal arm, with the opening portion fitting around and engaging with the engaging shoulder portion, wherein the supporting arm has a lower end for forming a joint protruding end-directly inserted into the joint hole, wherein the resilient clamping arm connects with the supporting arm, extends to the longitudinal arm, has a front end engaging with the engaging flange, and penetrates the opening portion to move resiliently.

2. The connection terminal structure of claim 1, wherein the longitudinal arm comprises a surface facing the clamping element and forming a wavy stripe.

3. The connection terminal structure of claim 1, wherein the transverse arm bends downward to form a leg.

* * * * *